Sept. 19, 1950    J. H. LE RETTE    2,522,579
COOKWARE HANDLE INSULATOR
Filed July 25, 1945
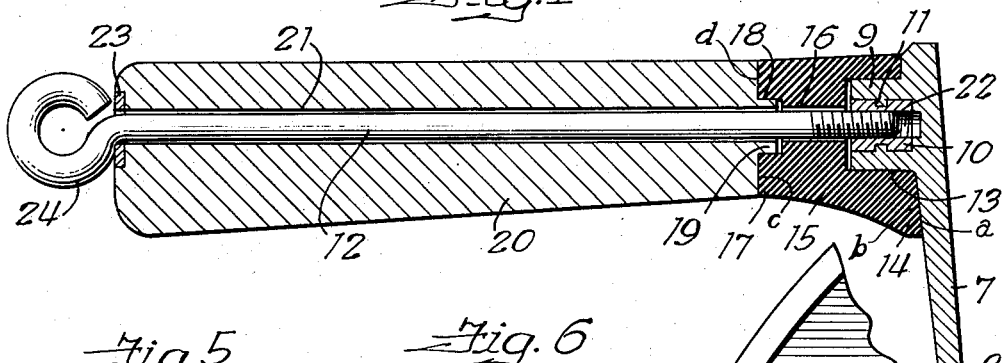
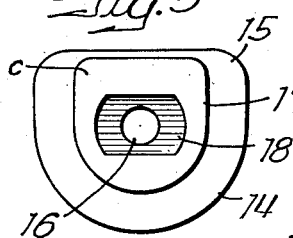
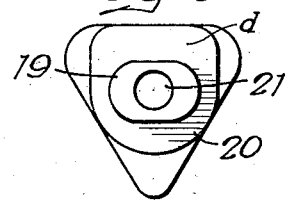
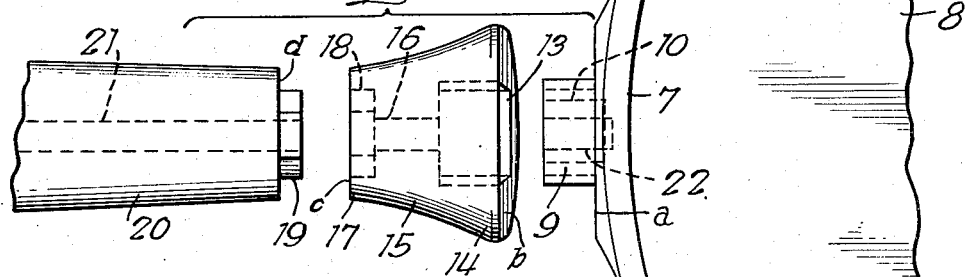
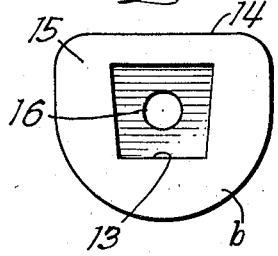
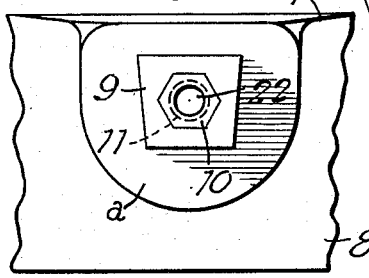
Inventor
Jerome H. Le Rette Patented Sept. 19, 1950

2,522,579

UNITED STATES PATENT OFFICE 2,522,579

COOKWARE HANDLE INSULATOR

Jerome H. Le Rette, Downers Grove, Ill., assignor to Advance Aluminum Castings Corporation, Chicago, Ill., a corporation of Illinois Application July 25, 1945, Serial No. 606,999

3 Claims. (Cl. 16—116)

This invention relates to cooking utensils, such as frying pans, sauce pans, and the like, and, more particularly, such utensils made of cast aluminum.

The principal object of my invention is to provide a new insulated handle assembly, in which a handle and insulator are combined in a novel manner with a nut in the form of a boss cast integral with the wall of the utensil, the insulator being long enough to space the handle sufficiently from the utensil for good protection against overheating, and being, furthermore, non-rotatably coupled thereto and designed to have broad surface to surface abutment on the wall of the utensil on a relatively large radius around the boss, so that when a through-bolt is entered through the handle and insulator and threaded in the nut and tightened, the resulting handle assembly is quite rigid and there is no likelihood of the handle working loose and tending to turn. The insulator incidentally is of tapered form, flaring from the handle toward the utensil on pleasingly curved lines so as to really enhance the appearance of the utensil as a whole, instead of being purely utilitarian.

An important feature of the present construction, aside from its greater simplicity and economy is the fact that the boss containing the nut constitutes only a very small projection and does not interfere with machine polishing of the utensils, in contrast with the old designs having long projecting necks which, aside from involving greater expense in the manufacture of utensils generally, necessitated considerable hand labor in polishing, thereby further seriously increasing the cost of production.

The invention is illustrated in the accompanying dawing, in which—

Fig. 1 is a vertical section longitudinally through an insulated handle for a utensil made in accordance with my invention;

Fig. 2 is an exploded top view of the handle, insulator, and utensil to better illustrate the construction and indicate the mode of assembly;

Fig. 3 is a side view of the utensil showing the keystone-shaped boss containing the nut that is cast integral with the wall of the utensil;

Fig. 4 is an end view of the insulator showing the keystone-shaped recess provided therein to accommodate the boss;

Fig. 5 is a view looking at the other end of the insulator showing the oblong-shaped recess to accommodate the end of the handle, and Fig. 6 is an end view of the handle showing the oblong-shaped projection on the end thereof adapted to fit in the recess in the adjacent end of the insulator.

The same reference numerals are applied to corresponding parts throughout the views.

The reference numeral 7 in Fig. 1 designates the side wall of a frying pan 8, a portion of which appears in plan view in Fig. 2. This utensil is of cast aluminum and has a generally rectangular or keystone-shaped boss 9 cast integral with the side wall near the upper edge on the outer side. A nut 10 is molded in place in the boss and is preferably of hexagonal form, so as to eliminate likelihood of its turning in the boss, and is also preferably annularly grooved, as indicated at 11, so that the molten metal entering the groove in the casting operation will permanently and securely lock the nut in place and there will be no likelihood of the nut pulling out when the through-bolt, indicated at 12, is tightened. The boss 9 has a close fit in a generally rectangular or keystone-shaped socket 13 provided in the enlarged end 14 of a tapered insulator 15, which is made of any suitable plastic heat insulating material of sufficient hardness and toughness to anchor the handle to the boss on the utensil without the necessity of a reinforcing metal ferrule or the like, so commonly found on kitchen utensil handles made of wood. A hole 16 extends lengthwise through the center of the insulator to accommodate the threaded end portion of the bolt 12. The reduced end 17 of the insulator has an oblong socket 18 provided therein, in which an oblong projection 19 on the inner end of a handle 20 is adapted to be entered with a close fit. The handle 20, which may be of wood or any other suitable material, has a longitudinally extending hole 21 provided therein in coaxial alignment with the hole 16 in the insulator and the threaded hole 22 in the nut 10 to accommodate the bolt 12. The handle while herein illustrated as of triangular cross-section (Fig. 6) may, of course, be of any suitable or preferred form, although the triangular cross-section will obviously afford a good grip and minimize likelihood of the handle turning in the hand. A recess in the outer end of the handle receives a washer 23 against which the head end 24 of the bolt is adapted to bear when the bolt is tightened.

It is important to note that the insulator 15, in addition to having the boss 9 entered non-rotatably in the socket 13, has broad surface to surface abutment on the outside of the utensil wall around the boss 9, there being a flat surface *a* provided on the utensil wall annularly of the boss 9 for abutment with the flat surface *b* provided on the end of the insulator. This surface to surface abutment, as clearly appears in the drawing, is on an appreciable radius relative to the boss 9, and, therefore, makes for good rigidity of the handle 20. The surfaces *a* and *b*, as clearly appears in Fig. 1, are in a plane at an acute angle to a plane normal to the axis of the bolt 12, whereby to prevent even slight relative rotation between the insulator and utensil if the boss 9 happens to fit a little too loosely in the socket 13, this is, of course, assuming that the bolt 12 has been properly tightened. The handle 20, furthermore, has a non-rotatable fit in the insulator 15 at 18—19 and has relatively broad surface to surface abutment on the end thereof on the back of the insulator, there being a flat surface c provided on the back of the insulator 15 annularly of the socket 18 for abutment with a flat surface d provided on the end of the handle 20 annularly of the projection 19. This surface to surface abutment obviously adds greatly to the rigidity of the handle. There is, furthermore, ample surface to surface abutment between the boss 9 and socket 13 and between the recess 18 and projection 19 to lend longitudinal rigidity to the handle assembly, independently of the bolt 12, and eliminate any likelihood of the insulator 15 turning with respect to the utensil, or the handle 20 turning with respect to the insulator. The flared form of the insulator, besides increasing the radius of surface to surface abutment between the insulator and utensil for increased rigidity of the handle, improves the appearance of the utensil as a whole. The insulator is long enough to space the handle sufficiently from the utensil for protection against over-heating due to hot up-drafts or flames alongside the utensil. The elimination of the long hollow neck provided in earlier constructions and the substitution of such a short projection 9 makes possible the polishing of a group of utensils by machine, because the polishing wheels can work up close to these bosses 9, and it requires only a slight backing up of the fixture holding the utensils to provide clearance for the bosses with respect to the polishing wheels, which, of course, can be operated automatically for the quantity production of these utensils. The long necks provided heretofore involved greater cost in the manufacture of the utensils and made a great deal of hand work necessary in the polishing of such utensils, thus further seriously increasing the manufacturing cost. In conclusion, it should be clear from the drawings that the present insulated handle assembly, aside from its greater simplicity and economy, and practicability and durability, also presents a neater and more attractive appearance than the earlier constructions.

It is believed the foregoing description conveys a good understanding of the objects and advantages of my invention. The appended claims have been drawn to cover all legitimate modifications and adaptations.

I claim:

1. An arrangement of the character described comprising, a cooking utensil having a wall provided with an integral and outwardly extending oblong-shaped boss having a threaded bore, said utensil wall annularly about said boss being thickened and having a flat outer face, an elongated handle having an oblong-shaped end of reduced cross-section, said handle adjacent the inner end of said reduced portion thereof having a flat circumferential shoulder, a heat insulator provided in each end with an oblong-shaped recess, said recesses being of a lesser diameter than the diameter of the insulator thus providing rigid surrounding walls about the recesses, a wall separating the inner adjacent ends of said recesses and provided with a central bore longitudinally thereof, the recess in one end of the insulator receiving in its entirety the utensil boss with the end of the insulator abutting the face of the thickened portion of the utensil wall, the recess in the other end of the insulator receiving in its entirety the reduced end of the handle with said end of the insulator abutting the circumferential shoulder of the handle, a bolt passing through the handle and the bore in that wall of the insulator between the recesses, the inner end of the bolt having threaded engagement in the bore of the utensil boss and serving to fasten the parts in rigid non-rotatable relationship to one another.

2. An arrangement of the character described comprising, a cooking utensil having a wall provided with an integral and outwardly extending oblong-shaped boss, said boss being of smaller length dimension than its height and width dimensions and provided with a threaded longitudinal bore, said utensil wall annularly about the boss being thickened and having a flat outer face, an elongated handle for the utensil having an oblong-shaped end of reduced cross-section forming on the handle at its juncture therewith a flat circumferential shoulder, a heat insulator formed of a block of non-metallic thermally non-conducting material which is longer than said boss and shorter than said handle and provided with oblong-shaped recesses formed one in each end of the insulator and separated at their inner ends by a wall provided with a central bore longitudinally thereof and in alignment with the central axes of the recesses, the insulator having flat surfaces surrounding the recess openings in the ends thereof, the recess in one end of the insulator receiving in its entirety the utensil boss with the insulator end being in abutment with the face of the thickened portion of the utensil wall, the recess in the other end of the insulator receiving in its entirety the reduced end portion of the handle with said end of the insulator abutting the circumferential shoulder of the handle, a bolt passing through the handle and the central bore of the insulator and having threaded engagement in the bore of the utensil boss, and the plane of the abutting surfaces between the insulator and the utensil being at an acute angle to the plane normal to the bolt axis so that tightening of the bolt will hold the insulator in sufficiently tight engagement with the utensil to prevent relative rotation even if the boss fits too loosely in the insulator recess.

3. A structure as defined in claim 2 wherein, the insulator is of an increased width in a vertical and horizontal direction at that end abutting the utensil wall thereby providing a maximum of surface to surface engagement between the utensil and the insulator to insure the maximum of rigidity in the handle structure.

JEROME H. LE RETTE.

REFERENCES CITED

The following references are of record in the file of this patent:

UNITED STATES PATENTS

| Number | Name | Date |
| --- | --- | --- |
| 484,483 | Wirt | Oct. 18, 1892 |
| 558,503 | Marbury | Apr. 21, 1896 |
| 1,606,833 | Grover | Nov. 16, 1926 |
| 1,732,003 | Drumm | Oct. 15, 1929 |
| 1,915,130 | Krause | June 20, 1933 |
| 1,970,151 | Smith | Aug. 14, 1934 |
| 2,018,895 | Lindsey | Oct. 29, 1935 |
| 2,172,524 | Stevens | Sept. 12, 1939 |
| 2,193,290 | Mahoney | Mar. 12, 1940 |
| 2,283,734 | Hoffeld et al. | May 19, 1942 |
| 2,317,349 | Wolfers | Apr. 27, 1943 |
| 2,372,954 | Jester | Apr. 3, 1945 |